(12) United States Patent  
Takami et al.

(10) Patent No.: US 12,233,875 B2  
(45) Date of Patent: Feb. 25, 2025

(54) HYBRID ALL-WHEEL-DRIVE VEHICLE

(71) Applicant: SUBARU CORPORATION, Tokyo (JP)

(72) Inventors: Masaki Takami, Tokyo (JP); Akihiro Nabeshima, Tokyo (JP); Takeshi Yoneda, Tokyo (JP); Hiroshi Tatekawa, Tokyo (JP); Katsuya Higuchi, Tokyo (JP); Norio Oowada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/928,820

(22) PCT Filed: Aug. 27, 2021

(86) PCT No.: PCT/JP2021/031488  
§ 371 (c)(1),  
(2) Date: Nov. 30, 2022

(87) PCT Pub. No.: WO2023/026466  
PCT Pub. Date: Mar. 2, 2023

(65) Prior Publication Data  
US 2024/0217519 A1 Jul. 4, 2024

(51) Int. Cl.  
*B60W 30/188* (2012.01)  
*B60K 6/52* (2007.10)  
(Continued)

(52) U.S. Cl.  
CPC ............ *B60W 30/188* (2013.01); *B60K 6/52* (2013.01); *B60W 10/06* (2013.01); *B60W 10/08* (2013.01);  
(Continued)

(58) Field of Classification Search  
CPC .... B60W 30/188; B60W 20/15; B60W 10/06; B60W 10/08; B60W 10/14; B60W 2554/60; B60W 2520/10; B60W 2540/103  
See application file for complete search history.

(56) References Cited

U.S. PATENT DOCUMENTS

| | | | |
|---|---|---|---|
| 8,645,041 B2 * | 2/2014 | Ishida | B60T 8/175 701/87 |
| 11,639,175 B2 * | 5/2023 | Kim | B60W 30/18009 701/38 |
| 2014/0019027 A1 * | 1/2014 | Kojima | B60L 50/16 701/102 |

FOREIGN PATENT DOCUMENTS

JP 2007-230343 A 9/2007

OTHER PUBLICATIONS

International Search Report in the corresponding International Application No. PCT/JP2021/031488 dated Nov. 16, 2021, with English Translation (4 pages).

* cited by examiner

*Primary Examiner* — Huan Le  
(74) *Attorney, Agent, or Firm* — Rimon P.C.

(57) ABSTRACT

When the operation amount of an accelerator exceeds a predetermined value at a time of climbing over a bump with either one of right and left front wheels, a HEV-CU increases the regenerative torque of a first motor generator, reduces the output torque of a second motor generator, and increases the engagement force of a LSD clutch of a center differential unit so as to reduce the input torque of a front LSD. When the operation amount of the accelerator exceeds the predetermined value at a time of climbing over a bump with either one of left and right rear wheels, the HEV-CU increases the regenerative torque of the first motor generator, reduces the (Continued)

output torque of the second motor generator, and reduces the engagement force of the LSD clutch so as to reduce the input torque of the rear LSD.

19 Claims, 4 Drawing Sheets

(51) Int. Cl.
*B60W 10/06* (2006.01)
*B60W 10/08* (2006.01)
*B60W 10/14* (2012.01)
*B60W 20/15* (2016.01)

(52) U.S. Cl.
CPC ............ *B60W 10/14* (2013.01); *B60W 20/15* (2016.01); *B60W 2520/10* (2013.01); *B60W 2540/103* (2013.01); *B60W 2554/60* (2020.02)

HYBRID ALL-WHEEL-DRIVE VEHICLE

This application is the U.S. National Phase under 35 US.C. § 371 of International Application No. PCT/JP2021/031488, filed on Aug. 27, 2021, the entire contents of each are hereby incorporated by reference.

TECHNICAL FIELD

The present invention relates to a hybrid all-wheel-drive vehicle and, in particular, relates to a hybrid all-wheel-drive vehicle equipped with a torque-sensitive limited slip differential.

BACKGROUND ART

An all-wheel-drive (AWD) vehicle (or a four-wheel-drive (4WD) vehicle) has excellent traveling performance on a steep slope, a rough road having many irregularities, a slippery road surface (for example, a snowy road or a muddy road), and the like, and the AWD vehicle has been widely put into practical use. In an all-wheel-drive vehicle (AWD vehicle), straight traveling stability is regarded as one of performance indexes. For example, straight traveling stability in which a yaw behavior of the vehicle does not change with respect to a road surface input at a time of climbing over a bump (hump) during low-speed traveling is required.

Here, PTL 1 discloses a four-wheel-drive vehicle in which front wheels or rear wheels are rotationally driven by a motor. The four-wheel-drive vehicle is configured to stabilize the behavior of the vehicle at a time of climbing over a bump and after the climbing-over. More specifically, in this four-wheel-drive vehicle, when it is determined that the front wheels driven by the engine have reached a bump and the vehicle intends to climb over the bump, the torque of the motor that rotationally drives the rear wheels is increased to increase the frictional force between the front wheels and the road surface and increase the rear wheel torque to climb over the bump. In addition, the increased rear wheel torque is reduced after the climbing-over to prevent the occurrence of sudden acceleration.

CITATION LIST

Patent Literature

PTL 1: Japanese Unexamined Patent Application Publication No. 2007-230343

SUMMARY OF INVENTION

Technical Problem

In an all-wheel-drive vehicle equipped with a torque-sensitive limited slip differential (LSD) that limits a differential between the left and right wheels in accordance with the magnitude of input torque (LSD torque), the input torque (LSD torque) may increase and the limited slip differential may function (intervene), for example, when a driver's accelerator operation is rough (in other words, a fluctuation in the accelerator operation amount becomes large) and an excessive accelerator operation is performed at a time of climbing over a bump (hump). Consequently, for example, when either one of the left and right wheels is on the bump, the differential between the left and right wheels may be limited (in other words, rotation of the wheel on the side on the bump (side where rotation speed is high) may be suppressed), which may generate a yaw moment in the vehicle and may deteriorate the straight traveling stability of the vehicle.

For example, when the technology disclosed in PTL 1 is applied, the input torque (LSD torque) of the rear wheels increases because the torque of the rear wheels increases at a time of climbing over a bump. For example, when either one of the left and right rear wheels is on the bump, the differential between the left and right rear wheels may be limited, which may generate a yaw moment in the vehicle and may deteriorate the straight traveling stability of the vehicle.

The present invention has been made to solve the aforementioned problems, and an object of the present invention is to provide a hybrid all-wheel-drive vehicle (AWD HEV vehicle) that is equipped with a torque-sensitive limited slip differential (LSD) and that is capable of suppressing deterioration of straight traveling stability at a time of climbing over a bump even when a rough accelerator operation is performed at the time of climbing over the bump.

Solution to Problem

A hybrid all-wheel-drive vehicle according to the present invention includes: an engine; a motor generator that is coupled such that torque can be transmitted between the motor generator and a crankshaft of the engine; a front limited slip differential that is between the engine and the motor generator and left and right front wheels, the front limited slip differential being a torque-sensitive type differential capable of limiting a differential between the left and right front wheels in accordance with an input torque; a center differential unit that is between the left and right front wheels and left and right rear wheels, the center differential unit comprising a center limited slip differential mechanism capable of limiting a differential of the left and right front wheels and the left and right rear wheels in accordance with an engagement force, and the center differential unit being configured to distribute an input torque to a front wheel side and a rear wheel side; a rear limited slip differential that is between the center differential unit and the left and right rear wheels, the rear limited slip differential being a torque-sensitive type differential capable of limiting a differential between the left and right rear wheels in accordance with an input torque; an accelerator-operation detection unit configured to detect an operation state of an accelerator; a bump detection unit configured to detect a bump on a road surface in front of a vehicle; and a control unit configured to control driving of the engine, driving of the motor generator, and an engagement force of the center limited slip differential mechanism. The control unit is configured to, in a case where an operation amount of the accelerator exceeds a predetermined value at a time of climbing over the bump detected by the bump detection unit, control the driving of the motor generator and the engagement force of the center limited slip differential mechanism so as to reduce an input torque of the front limited slip differential and/or the rear limited slip differential in accordance with wheel(s) being on the bump.

DESCRIPTION OF EMBODIMENTS

Hereinafter, a preferred embodiment of the present invention will be described in detail with reference to the drawings. In the drawings, the same or corresponding parts are denoted by the same reference signs. In the drawings, the same components are denoted by the same reference signs, and overlapping description will be omitted.

Figure 1:
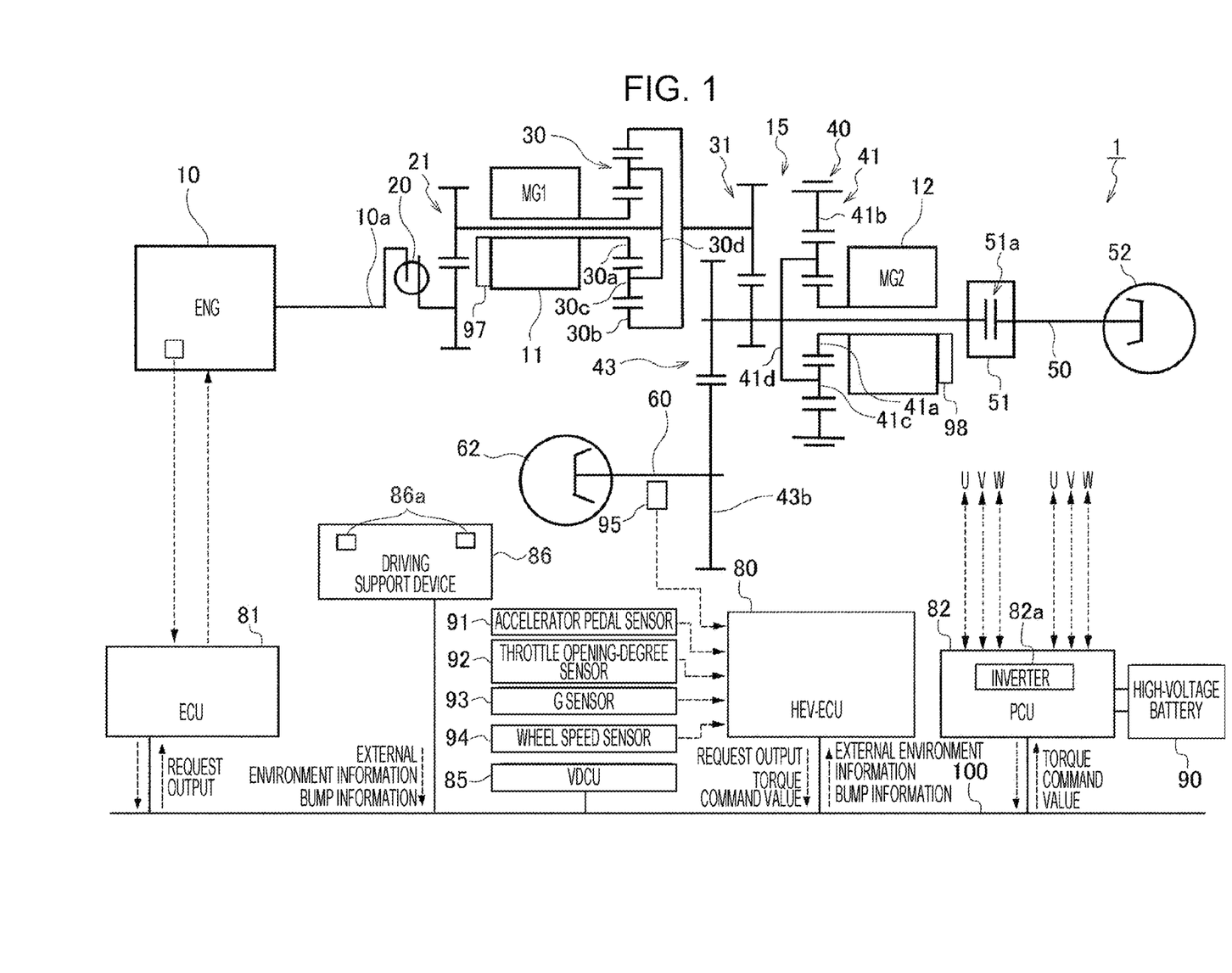
FIG. 1 illustrates a configuration of a power unit of a hybrid all-wheel-drive vehicle and a control device of the power unit according to an embodiment.

First, a configuration of a hybrid all-wheel-drive vehicle (AWD HEV) 1 according to an embodiment will be described with reference to FIG. 1. FIG. 1 illustrates a configuration of a power unit of the hybrid all-wheel-drive vehicle 1 and a control device of the power unit.

An engine 10 may be of any type. Examples of the engine 10 include a horizontally opposed direct-injection 4-cylinder gasoline engine. In the engine 10, air taken in from an air cleaner is throttled by an electronically controlled throttle valve (hereafter, also simply referred to as "throttle valve") provided in an intake pipe, passes through an intake manifold, and is taken into each cylinder formed in the engine 10. Here, the amount of air taken in from the air cleaner is detected by an air flow meter. An injector that injects fuel is attached to each cylinder. Each cylinder is provided with an ignition plug for igniting an air-fuel mixture, and a coil with a built-in igniter for applying a high voltage to the ignition plug. In each cylinder of the engine 10, an air-fuel mixture of intake air and fuel injected by the injector is ignited by the ignition plug and combusted. An exhaust gas after combustion is discharged through an exhaust pipe.

In addition to the above-described air flow meter, a cam angle sensor for performing cylinder identification of the engine 10 is attached in the vicinity of a camshaft of the engine 10. In the vicinity of a crankshaft 10a of the engine 10, a crank angle sensor that detects the position of the crankshaft 10a is attached. These sensors are coupled to an engine control unit (hereafter referred to as "ECU") 81, which will be described later.

A power split mechanism 30 is coupled to the crankshaft 10a of the engine 10 via a flywheel damper 20 that absorbs rotational fluctuation of the engine 10 and a pair of gears 21.

A drive train 15 that includes a plurality of gears, shafts, and the like and transmits torque to drive wheels, and a first motor generator (MG1) 11 are coupled to the power split mechanism 30. The power split mechanism 30 has, for example, a planetary gear mechanism constituted by a sun gear 30a, a ring gear 30b, a pinion gear 30c, and a planetary carrier 30d, and splits and transmits the drive torque generated from the engine 10 to the drive train 15 and the first motor generator 11.

To be more specific, the planetary carrier 30d is coupled to the crankshaft 10a of the engine 10 via the flywheel damper 20 and the pair of gears 21. The sun gear 30a is coupled to the first motor generator 11. On the other hand, the ring gear 30b is coupled to a propeller shaft 50 constituting the drive train 15 via a pair of gears (counter gears) 31, and is further coupled to a front drive shaft 60 via a drive reduction gear 43.

When the first motor generator 11 functions as a generator (power generator), the power split mechanism 30 distributes torque (driving force) from the engine 10 which is input from the planetary carrier 30d, to the sun gear 30a and the ring gear 30b in accordance with the gear ratios of the two gears. On the other hand, when the first motor generator 11 functions as a motor (electric motor), the power split mechanism 30 integrates the torque from the engine 10 which is input from the planetary carrier 30d and the torque from the first motor generator 11 input from the sun gear 30a, and outputs the integrated torque to the ring gear 30b. The torque output to the ring gear 30b is output to the propeller shaft 50 constituting the drive train 15 via the pair of gears (counter gears) 31, and is further output to the front drive shaft 60 via the drive reduction gear 43.

Meanwhile, a second motor generator (MG2) 12 is also coupled to the drive train 15. To be more specific, the second motor generator 12 is coupled to the propeller shaft 50 via a motor reduction gear 41. The second motor generator 12 is coupled to the front drive shaft 60 via a drive reduction gear mechanism 40 including the motor reduction gear 41 and the drive reduction gear 43. The front drive shaft 60 transmits torque to the front wheels. The propeller shaft 50 transmits torque to the rear wheels.

Each of the first motor generator 11 and the second motor generator 12 is configured as a synchronous generator motor having both a function as a motor for converting supplied electric power into mechanical power and a function as a generator for converting input mechanical power into electric power. That is, each of the first motor generator 11 and the second motor generator 12 operates as a motor that generates drive torque when the vehicle is driven, and operates as a generator during regeneration. The first motor generator 11 mainly operates as a generator, and the second motor generator 12 mainly operates as a motor.

The drive reduction gear mechanism 40 includes the motor reduction gear 41 and the drive reduction gear 43. Further, the motor reduction gear 41 is constituted by a planetary pinion, and the drive reduction gear 43 is constituted by, for example, a spur gear (or a helical gear).

More specifically, the motor reduction gear 41 has a planetary gear mechanism including, for example, a sun gear 41a, a ring gear 41b, a pinion gear 41c, and a planetary carrier 41d. When the second motor generator 12 functions as a motor, the motor reduction gear 41 decelerates (increases the torque) the rotation transmitted from the second motor generator 12 and outputs the rotation from the planetary carrier 41d. On the other hand, the motor reduction gear 41 causes the second motor generator 12 to function as a generator by accelerating (reducing the torque) the rotation caused by the torque (driving force) input to the planetary carrier 41d and outputting the rotation from the sun gear 41a.

The front drive shaft 60 transmits torque between the drive reduction gear mechanism 40 and drive wheels (front wheels in the example in FIG. 1). More specifically, the torque of the second motor generator 12 and the like transmitted to the front drive shaft 60 is transmitted to a front LSD 62 (corresponding to a front limited slip differential in the claims).

As the front LSD 62, for example, a torque-sensitive helical LSD is used. The front LSD (helical LSD) 62 has a structure in which a side gear and a pinion gear are helical gears (oblique teeth), and limits a differential by pressing the pinion gear against a differential case with a tooth pressure reaction force of the helical gears increasing in proportion to an input torque (drive torque). Therefore, as the input torque (LSD torque) increases, the differential limitation by the front LSD 62 becomes stronger. Torque from the front LSD 62 is transmitted to a left front wheel (not illustrated) via a left-front-wheel drive shaft, and is transmitted to a right front wheel (not illustrated) via a right-front-wheel drive shaft.

The propeller shaft 50 transmits torque to the rear wheels. A center differential unit 51 that adjusts the torque to be transmitted to the rear wheel side is interposed at the propeller shaft 50. In this embodiment, as the center differential unit 51, a system in which a center differential constituted by a planetary pinion unit having front-rear unequal torque distribution is combined with a limited slip differential mechanism (corresponding to a center limited slip differential mechanism described in the claims) constituted by a multi-plate clutch (hereafter referred to as "LSD clutch") 51*a* and in which the engagement force (that is, the strength of differential limitation) of the LSD clutch 51*a* is electrically adjustable is adopted. In addition to the above-described configuration, the center differential unit 51 is also incorporated with a cam mechanism for raising a clutch pressing force by a torque difference in order to generate a differential limiting force at the moment when a difference occurs in the road surface reaction force. In the center differential unit 51, for example, torque distribution ratio of 41 for the front wheels to 59 for the rear wheels is used as a basis, and stability is ensured while a large driving force is exerted due to front-rear torque distribution in accordance with a traveling condition by the LSD clutch 51*a*.

The LSD clutch 51*a* varies the torque distribution to the front and rear wheels in accordance with the engagement force of the LSD clutch 51*a*, and exerts a differential limitation function. As the LSD clutch 51*a*, for example, an electromagnetic clutch or the like capable of electrically adjusting the engagement force (engagement/disengagement) is suitably used. The engagement force (differential limitation) of the LSD clutch 51*a* is controlled by a hybrid control unit (hereafter referred to as "HEV-CU") 80. The torque of the second motor generator 12 and the like transmitted to the propeller shaft 50 is distributed by the center differential unit 51 (in accordance with the engagement force of the LSD clutch 51*a*), and is also transmitted (distributed) to the rear wheel side.

The torque transmitted to the propeller shaft 50 and distributed (adjusted) by the center differential unit 51 is transmitted to a rear LSD 52 (corresponding to a rear limited slip differential described in the claims). For example, a torque-sensitive (torque-sensitive type) LSD in which a plurality of gears are combined together and in which meshing resistance of the gears and a frictional force with respect to the differential case are utilized is used as the rear LSD 52. Therefore, as the input torque (LSD torque) increases, the differential limitation by the rear LSD 52 becomes stronger.

A left-rear-wheel drive shaft and a right-rear-wheel drive shaft (not illustrated) are coupled to the rear LSD 52. The driving force from the rear LSD 52 is transmitted to the left rear wheel (not illustrated) via the left-rear-wheel drive shaft, and is transmitted to the right rear wheel (not illustrated) via the right-rear-wheel drive shaft.

With such a configuration, in the hybrid all-wheel-drive vehicle (AWD HEV) 1 according to the present embodiment, the front wheels and the rear wheels (vehicle) can be driven by the power of the two of the engine 10 and the second motor generator 12. In addition, for example, it is possible to switch between traveling using only the second motor generator 12 (EV traveling) and traveling using the engine 10 and the second motor generator 12 in accordance with traveling conditions. Further, electric power can be generated by the second motor generator 12 or the like.

The engine 10, the second motor generator 12, and the first motor generator 11, which are driving force sources of the vehicle, are comprehensively controlled by the HEV-CU 80.

The HEV-CU 80 includes a microprocessor that performs arithmetic operations, an EEPROM that stores programs and the like for causing the microprocessor to execute various processes, a RAM that stores various kinds of data such as arithmetic results, a backup RAM that holds the stored contents, an input/output I/F, and the like.

The HEV-CU 80 is coupled to various sensors including, for example, an accelerator pedal sensor 91 (corresponding to an accelerator operation detection unit described in the claims) for detecting a depression amount of an accelerator pedal (operation amount of an accelerator), a throttle opening-degree sensor 92 for detecting the opening degree of the throttle valve, a G sensor (acceleration sensor) 93 for detecting longitudinal and lateral acceleration of the vehicle, a wheel speed sensor 94 for detecting the speed of each wheel, a rotation speed sensor 95 for detecting the rotation speed of the front drive shaft 60, a resolver 97 for detecting the number of revolutions (rotation speed) of the first motor generator 11, a resolver 98 for detecting the number of revolutions (rotation speed) of the second motor generator 12, and the like.

The HEV-CU 80 is mutually communicably coupled via a CAN (controller area network) 100 to the ECU 81 for controlling the engine 10, a PCU 82, a vehicle-dynamics control unit (hereafter referred to as "VDCU") 85 for improving traveling stability by suppressing skidding and the like of the vehicle, a driving support device 86, and the like.

The HEV-CU 80 receives various kinds of information such as an engine rotation speed, vehicle wheel speed information, a yaw rate, and a brake operation amount from the ECU 81 and the VDCU 85 via the CAN 100. In addition, the HEV-CU 80 receives various kinds of external environment information (details will be described later) including bump information from the driving support device 86 via the CAN 100.

The HEV-CU 80 comprehensively controls driving of the engine 10, the second motor generator 12, and the first motor generator 11 based on these acquired various kinds of information. During normal control, the HEV-CU 80 obtains and outputs a request output of the engine 10 and the torque command values of the second motor generator 12 and the first motor generator 11 based on, for example, a depression amount of the accelerator pedal (driver's request driving force), an operational state of the vehicle, a state of charge (SOC) of a high voltage battery (hereafter, also simply referred to as "battery") 90, and the like.

The ECU 81 includes a microprocessor that performs arithmetic operations, an EEPROM that stores programs and the like for causing the microprocessor to execute various processes, a RAM that stores various kinds of data such as arithmetic operation results, a backup RAM that holds the stored contents by using a battery or the like, an input/output I/F, and the like. The above-described various sensors, such as the crank angle sensor, the cam angle sensor, and the air flow meter, are coupled to the ECU 81. Further, the ECU 81 is provided with an injector driver for driving an injector, an output circuit for outputting an ignition signal, a motor driver for driving an electric motor that opens and closes the electronically controlled throttle valve, and the like.

The ECU 81 identifies the cylinders from an output of the cam angle sensor and obtains the engine speed from a change in the rotational position of the crankshaft 10*a* detected based on the output of the crank angle sensor. The ECU 81 also obtains various kinds of information such as an intake air amount, an air-fuel ratio of an air-fuel mixture, and a water temperature based on detection signals input from the above-described various kinds of sensors.

Furthermore, the ECU 81 receives information such as a request output, the number of revolutions (rotation speed) of the first motor generator 11, the number of revolutions (rotation speed) of the second motor generator 12, and the amount of depression of the accelerator pedal from the HEV-CU 80 via the CAN 100. Then, the ECU 81 controls the engine 10 by controlling the fuel injection amount and/or the ignition timing, controlling various devices such as the throttle valve based on the request output from the HEV-CU 80 and the acquired these various kinds of information.

The PCU 82 drives the second motor generator 12 and the first motor generator 11 via an inverter 82*a* based on the torque command values. The PCU 82 includes the inverter 82*a* that converts DC power of the high-voltage battery 90 into three-phase AC power and supplies the three-phase AC power to the second motor generator 12 and the first motor generator 11. As described above, the PCU 82 drives the second motor generator 12 and the first motor generator 11 via the inverter 82*a* based on the torque command values received from the HEV-CU 80. On the other hand, during regeneration, the inverter 82*a* converts an AC voltage generated by the first motor generator 11 or the like into a DC voltage and charges the high-voltage battery 90.

The driving support device 86 has a function (an automatic braking function/a pre-crash braking function) of detecting an external environment of the vehicle (for example, a traveling environment in front of the vehicle) and performing warning and automatic braking (automatic brake) with respect to a front obstacle. The driving support device 86 also has a function of supporting the driving operation of the driver by performing follow-up control and warning control with respect to a detected preceding vehicle.

The driving support device 86 processes image data captured by, for example, a stereo camera 86*a* including a pair of cameras for acquiring an image in front of the vehicle, and detects a traveling environment (external environment) outside the vehicle such as a situation of a traveling road, a preceding vehicle and an obstacle.

The driving support device 86 performs image processing on the image data and detects a lane (travel lane) based on a road marking line (lane line) or the like drawn on a road on which the vehicle travels. Based on the detected lane, the driving support device 86 detects, for example, the presence or absence of a curve, the distance to the curve, the radius (curvature) of the curve, the width of the road, and the like. Further, the driving support device 86 extracts a preceding vehicle from the captured image by edge extraction, pattern recognition processing, and the like, obtains an inter-vehicle distance to the preceding vehicle by a triangulation method based on a difference in position of the preceding vehicle in the left and right acquired images, and obtains a relative speed (whether the preceding vehicle has decelerated) from a change amount with respect to the distance obtained in the previous frame.

In particular, the driving support device 86 detects whether there is a bump (hump) on the road surface in front of the vehicle and, when there is the bump (hump), detects the distance to the bump (hump). In addition, the driving support device 86 detects the shape and the size (lateral width, length, height) of the bump (hump), the arrangement of the bump on the road, and the like. That is, the driving support device 86 functions as a bump detection unit described in the claims. The driving support device 86 transmits external environment information including the detected bump information to the HEV-CU 80 via the CAN 100.

The HEV-CU 80 also controls the engagement force of the LSD clutch 51*a* of the center differential unit 51 based on the information acquired from the above-described various sensors and the like and various information (bump information and the like) acquired via the CAN 100.

The HEV-CU 80 controls the engagement force of the LSD clutch 51*a* by adjusting the electric power applied to the LSD clutch 51*a*. For example, the HEV-CU 80 suppresses wheel slip (differential between the front wheels and the rear wheels) by increasing the engagement force (differential limitation) when the input torque is large.

In particular, the HEV-CU 80 has a function of suppressing the deterioration of the straight traveling stability at a time of climbing over a bump (hump) even when a rough accelerator operation is performed at the time of climbing over the bump in the hybrid all-wheel-drive vehicle (AWD HEV vehicle) 1 on which the torque-sensitive front LSD 62, the rear LSD 52, and the center differential unit 51 (LSD clutch 51*a*) are mounted. That is, the HEV-CU 80 functions as the control unit described in the claims. The programs stored in the EEPROM or the like are executed by the microprocessor in the HEV-CU 80, thereby realizing the above-described functions.

To be more specific, when the operation amount of the accelerator exceeds a predetermined value (becomes excessive) at a time of climbing over a bump with either one (only one wheel) of the left and right front wheels, the HEV-CU 80 controls driving of the first motor generator 11 and the second motor generator 12 (in other words, increases the regenerative torque (regeneration amount) of the first motor generator 11 (reduces direct torque), reduces the output torque of the second motor generator 12), and increases the engagement force of the LSD clutch 51*a* (engages the LSD clutch 51*a*) of the center differential unit 51 (in other words, increases the torque transmitted to the rear wheel side), so as to reduce the input torque of the front LSD 62 (compared with the normal control). It is preferable that the HEV-CU 80 sets the amount of increase in the regenerative torque of the first motor generator 11 and the amount of reduction in the output torque of the second motor generator 12 on the basis of the shape, the size, the height, and the like of the detected bump (that is, in consideration of the torque required for climbing over the bump).

On the other hand, when the operation amount of the accelerator exceeds a predetermined value (becomes excessive) at a time of climbing over a bump with either one (only one wheel) of the left and right rear wheels, the HEV-CU 80 controls driving of the first motor generator 11 and the second motor generator 12 (in other words, increases the regenerative torque of the first motor generator 11 (reduces direct torque), reduces the output torque of the second motor generator 12), and reduces the engagement force of the LSD clutch 51*a* (disengages the LSD clutch 51*a*) of the center differential unit 51 (in other words, reduces the torque transmitted to the rear wheel side), so as to reduce the input torque of the rear LSD 52 (compared with the normal control). If the embodiment is configured such that the torque transmission to the left and right rear wheels can be made zero or substantially zero by disengaging the LSD clutch, the HEV-CU 80 may, after the left and right front wheels climb over the bump, disengage the LSD clutch, end increasing the regenerative torque of the first motor generator 11 (reducing the direct torque) and reducing the output torque of the second motor generator 12, and set the regenerative torque and the output torque at the time of normal control.

When the operation amount of the accelerator exceeds a predetermined value (becomes excessive) at a time of climbing over a bump with both the left and right front wheels (both wheels), the HEV-CU 80 controls driving of the first motor generator 11 and the second motor generator 12 (in other words, increases the regenerative torque of the first motor generator 11 (reduces the direct torque), and reduces the output torque of the second motor generator 12), and decreases the engagement force of the LSD clutch 51*a* (disengages the LSD clutch 51*a*) of the center differential unit 51 (in other words, loosens the differential limitation of the front and rear wheels), so as to reduce the input torque of the front LSD 62 (compared with the normal control). It is preferable that the HEV-CU 80 sets the amount of increase in the regenerative torque of the first motor generator 11 and the amount of reduction in the output torque of the second motor generator 12 on the basis of the shape, the size, the height, and the like of the detected bump (that is, in consideration of the torque required for climbing over the bump).

Similarly, when the operation amount of the accelerator exceeds a predetermined value (becomes excessive) at a time of climbing over a bump with both the left and right rear wheels (both wheels), the HEV-CU 80 controls driving of the first motor generator 11 and the second motor generator 12 (in other words, increases the regenerative torque of the first motor generator 11 (decreases the direct torque), reduces the output torque of the second motor generator 12), and reduces the engagement force of the LSD clutch 51*a* of the center differential unit 51 (disengages the LSD clutch 51*a*), so as to reduce the input torque of the rear LSD 52 (compared with the normal control). If the embodiment is configured such that the torque transmission to the left and right rear wheels can be made zero or substantially zero by disengaging the LSD clutch, the HEV-CU 80 may, after the left and right front wheels climb over a bump, disengage the LSD clutch, end increasing (reducing the direct torque) the regenerative torque of the first motor generator 11 and reducing the output torque of the second motor generator 12, and set the regenerative torque and the output torque at the time of normal control.

For example, the HEV-CU 80 predicts the timing of climbing over a detected bump (hump) based on the distance to the bump and the vehicle speed and determines, based on the wheel speed of each of the four wheels, whether each wheel is on the bump. In addition, it is preferable that the HEV-CU 80 predicts the timing at which each of the front wheels and the rear wheels finishes climbing over the detected bump (hump) on the basis of the shape and size (length and height) of the bump and the vehicle speed and determines whether each of the front wheels and the rear wheels finishes climbing over the bump on the basis of the wheel speed of each of the four wheels. At this time, the HEV-CU 80 may consider a value detected by the G sensor (acceleration sensor) 93, and the like.

The HEV-CU 80 predicts (determines) whether a detected bump is to be climbed over with one wheel (either one of the right and left wheels) or both wheels (both the right and left wheels) based on, for example, the shape and the size (lateral width, length) of the bump, and the arrangement of the bump on the road, and specifies a wheel that is on the bump based on the wheel speed of each of the four wheels.

In the HEV-CU 80, after the left and right front wheels and the left and right rear wheels climb over the bump (hump), the control returns from the bump climbing-over control to the normal control. That is, as described above, the HEV-CU 80 controls the driving of the engine 10, the first motor generator 11, and the second motor generator 12 in accordance with the operation amount of the accelerator and the like and controls the engagement force of the LSD clutch 51*a* of the center differential unit 51 in accordance with the operational state of the vehicle. At this time, the torque is gradually (gently) restored in order to avoid a sudden torque change.

Figure 2:
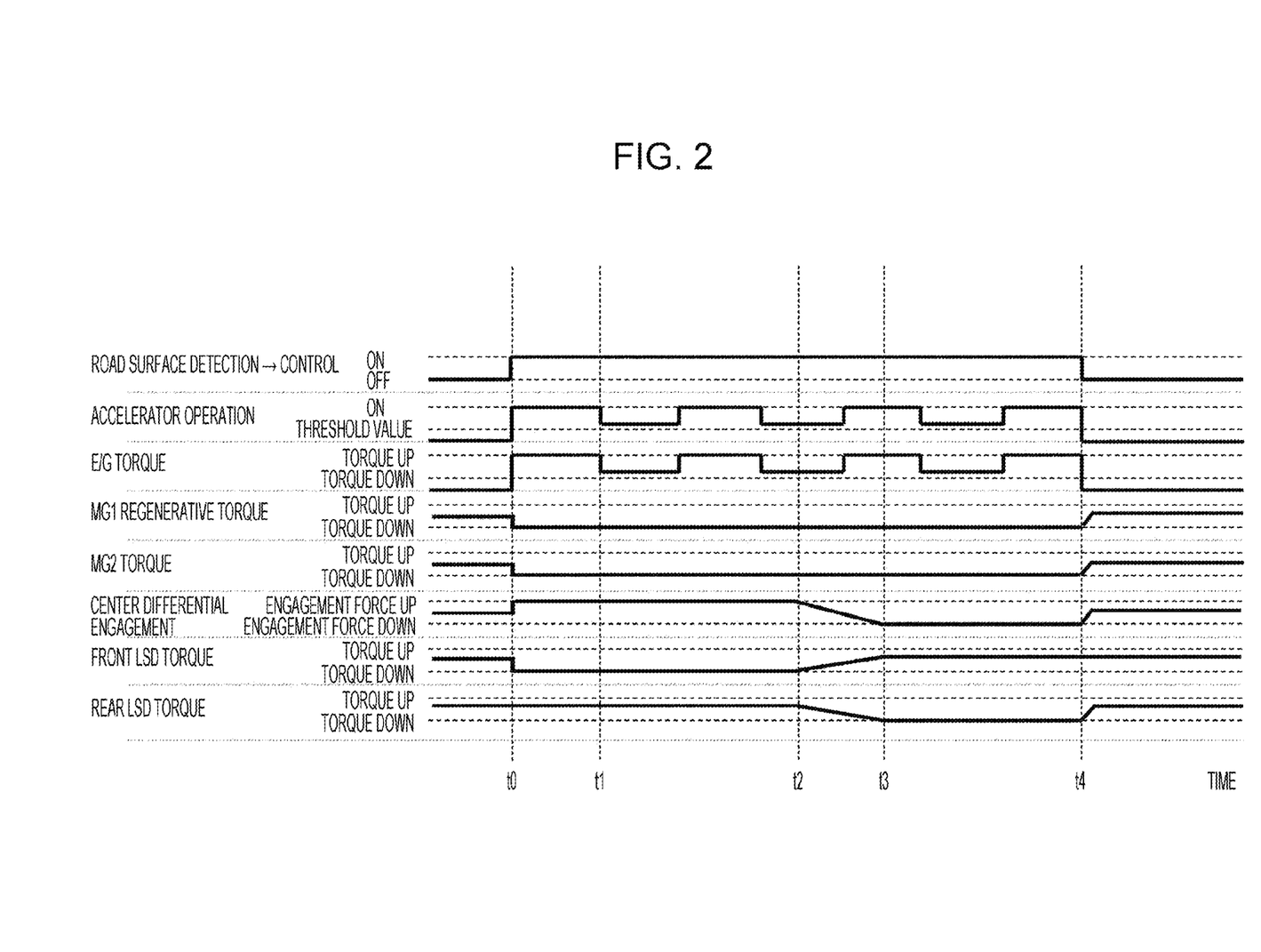
FIG. 2 is a timing chart illustrating an example of changes in MG1 torque, MG2 torque, front LSD torque, rear LSD torque, and the like at a time of climbing over a bump with one wheel.
Figure 3:
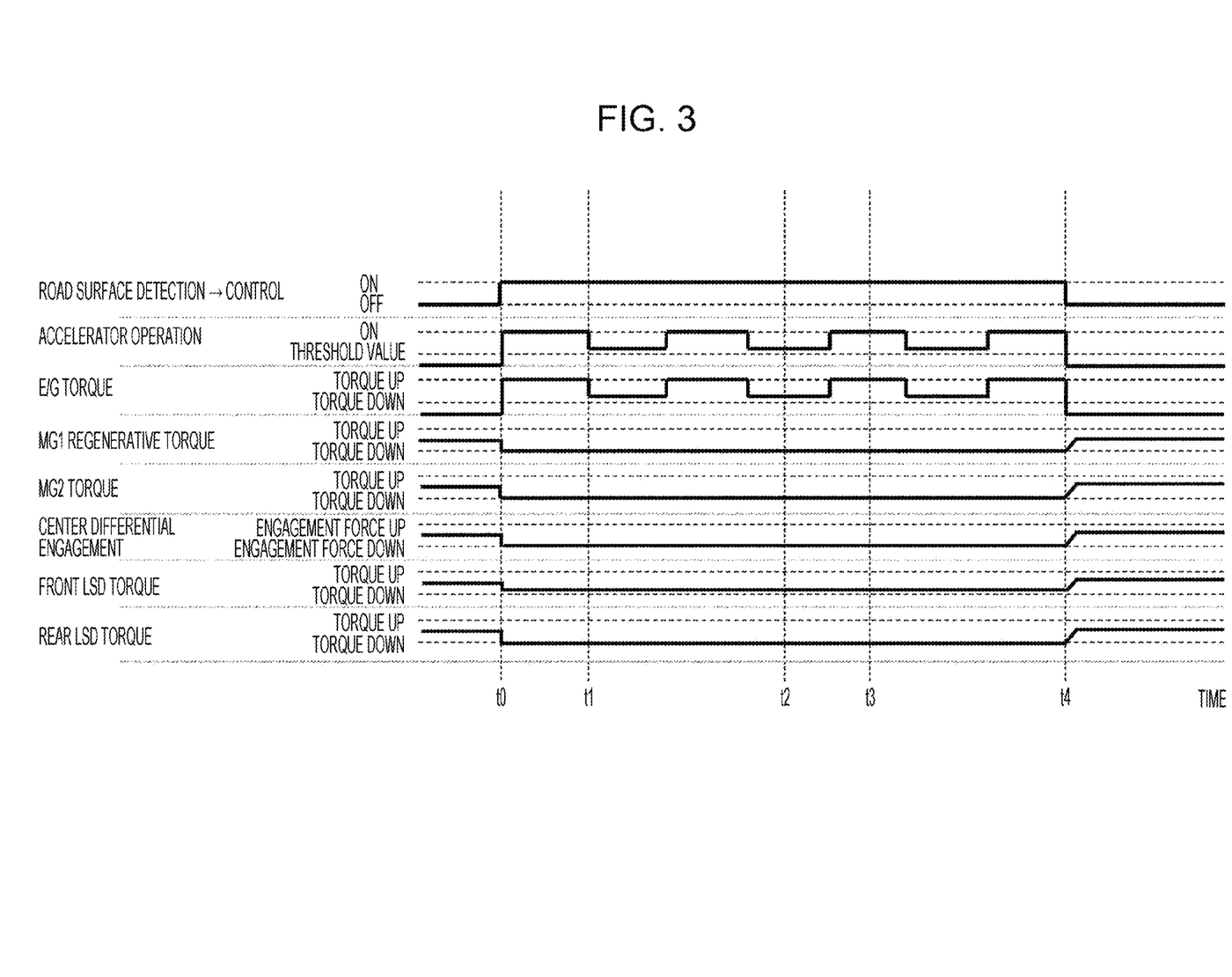
FIG. 3 is a timing chart illustrating an example of changes in the MG1 torque, the MG2 torque, the front LSD torque, the rear LSD torque, and the like at a time of climbing over a bump with both wheels.
Figure 4:
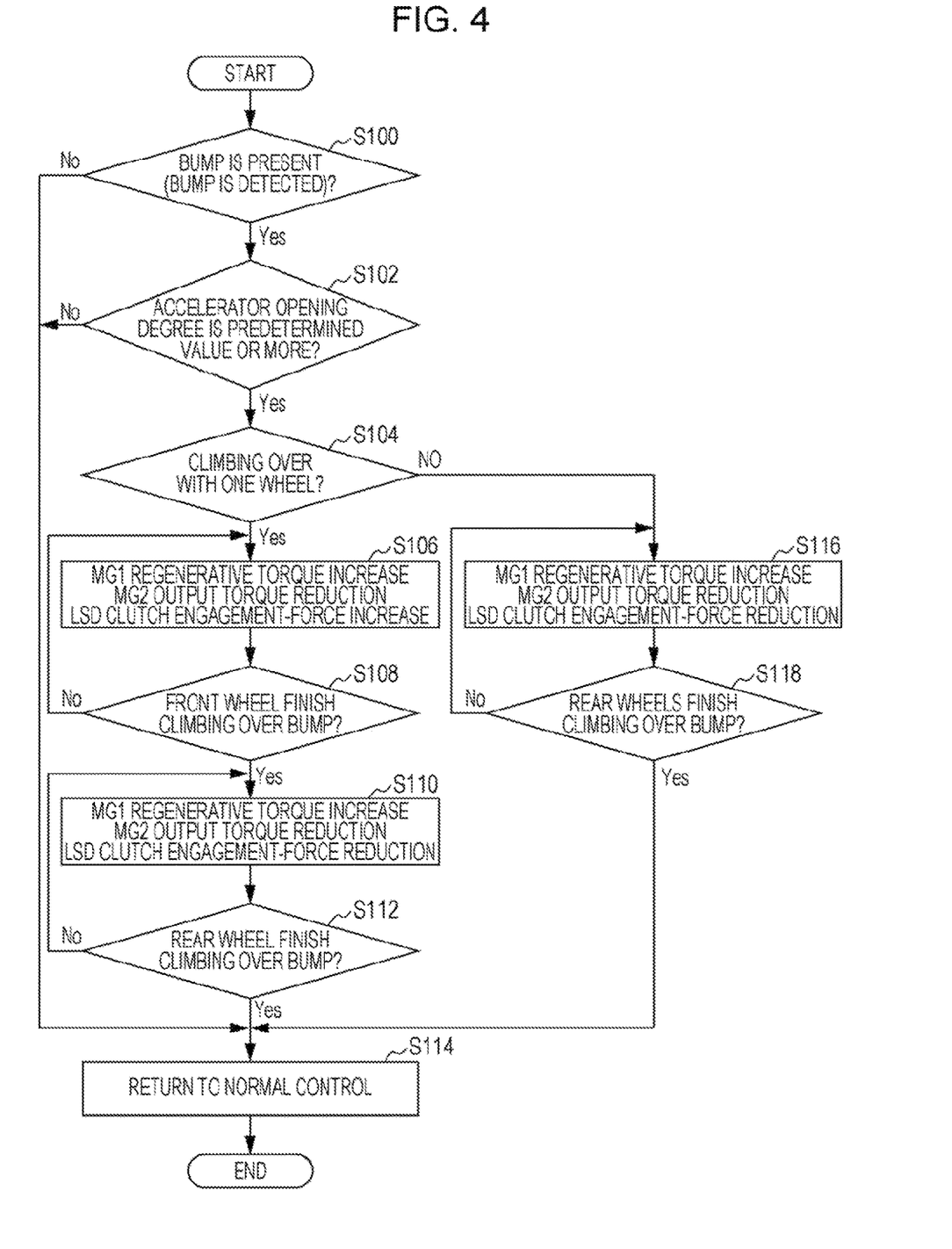
FIG. 4 is a flowchart illustrating a processing procedure of bump climbing-over control by a HEV-CU constituting the hybrid all-wheel-drive vehicle according to the embodiment.

Next, the operation of the hybrid all-wheel-drive vehicle 1 will be described with reference to FIG. 2 to FIG. 4. FIG. 2 is a timing chart illustrating an example of changes in the MG1 torque, the MG2 torque, the front LSD torque, the rear LSD torque, and the like at a time of climbing over a bump with one wheel. FIG. 3 is a timing chart illustrating an example of changes in the MG1 torque, the MG2 torque, the front LSD torque, the rear LSD torque, and the like at a time of climbing over a bump with both wheels. FIG. 4 is a flowchart illustrating a processing procedure of the bump climbing-over control by the HEV-CU 80 constituting the hybrid all-wheel-drive vehicle 1. This processing is repeatedly executed at a predetermined timing in the HEV-CU 80.

In step S100, it is determined whether a bump (hump) is present on the road surface ahead of the vehicle (whether a bump is detected). Here, when there is no bump (hump) on the road surface in front of the vehicle, the process is exited. On the other hand, when a bump (hump) is detected on the road surface ahead of the vehicle (see time to in FIG. 2 and time to in FIG. 3), the process proceeds to step S102.

In step S102, it is determined whether the operation amount of the accelerator exceeds a predetermined value (threshold value) (whether the operation amount of the accelerator becomes excessive). Here, when the operation amount of the accelerator does not exceed the predetermined value, the process is exited. On the other hand, when the operation amount of the accelerator exceeds the predetermined value, the process proceeds to step S104.

In step S104, it is determined whether the bump is to be climbed over with either one of the left wheels and the right wheels (or, with only one wheel of the left wheel and the right wheel). Here, when it is determined that the bump is not to be climbed over with either one of the left wheels and the right wheels (or, with only one wheel of the left wheel and the light wheel), that is, when it is determined that the bump is to be climbed over with both of the left wheel (s) and the right wheel (s), the process proceeds to step S116. On the other hand, when it is determined that the bump is to be climbed over with either one of the left wheels and the right wheels (or, with only one wheel of the left wheel and the light wheel), the process proceeds to step S106.

In step S106, in order to reduce the input torque of the front LSD 62 (compared with the normal control), the driving of the first motor generator 11 and the second motor generator 12 is controlled (in other words, the regenerative torque of the first motor generator 11 is increased (the direct torque is reduced), the output torque of the second motor generator 12 is reduced), and the engagement force of the LSD clutch 51*a* of the center differential unit 51 is increased (the LSD clutch 51a is engaged) (in other words, the torque transmitted to the rear wheel side is increased) (see time t0 to time t2 in FIG. 2).

Next, in step S108, whether a front wheel has finished climbing over the bump is determined. Here, when the front wheel has not yet finished climbing over the bump, the process proceeds to step S106, and the above-described processes of steps S106 to S108 are repeatedly executed until the front wheel finishes climbing over the bump. On the other hand, when the front wheel has finished climbing over the bump, the process proceeds to step S110.

In step S110, in order to reduce the input torque of the rear LSD 52 (compared with the normal control), the driving of the first motor generator 11 and the second motor generator 12 is controlled (that is, the regenerative torque of the first motor generator 11 is increased (the direct torque is reduced), the output torque of the second motor generator 12 is reduced), and the engagement force of the LSD clutch 51a of the center differential unit 51 is reduced (the LSD clutch 51a is disengaged) (that is, the torque transmitted to the rear wheel side is reduced) (see time t2 to time t4 in FIG. 2). In order to avoid a sudden torque change, the engagement force of the LSD clutch 51a is gradually (gently) reduced.

Next, in step S112, whether a rear wheel has finished climbing over the bump is determined. Here, when the rear wheel has not yet finished climbing over the bump, the process proceeds to step S110, and the above-described processes of steps S110 to S112 are repeatedly executed until the rear wheel finishes climbing over the bump. On the other hand, when the rear wheel has finished climbing over the bump, the process proceeds to step S114.

When climbing over the bump is finished, the bump climbing-over control returns to the normal control in step S114. Thereafter, the process is exited (see time t4 onward in FIG. 2).

When it is determined in the above-described step S104 that the bump is to be climbed over with both wheels, the process proceeds to step S116. In step S116, the driving of the first motor generator 11 and the second motor generator 12 is controlled (in other words, the regenerative torque of the first motor generator 11 is increased (the direct torque is reduced), and the output torque of the second motor generator 12 is reduced), and the engagement force of the LSD clutch 51a of the center differential unit 51 is reduced (the LSD clutch 51a is disengaged) (in other words, differential limitation of the front and rear wheels is loosened), so as to reduce the input torque of the front LSD 62 (compared with the normal control) (see time t0 to time t4 in FIG. 3).

Subsequently, in step S118, whether the rear wheels have finished climbing over the bump is determined. Here, when the rear wheels have not yet finished climbing over the bump, the process proceeds to step S116, and the above-described processes of steps S116 to S118 are repeatedly executed until the rear wheels finish climbing over the bump. On the other hand, when the rear wheels have finished climbing over the bump, the process proceeds to step S114.

When climbing over the bump is finished, the bump climbing-over control returns to the normal control in step S114. Thereafter, the process is exited (see time t4 onward in FIG. 3).

As described above in detail, according to the present embodiment, when the operation amount of the accelerator exceeds a predetermined value (becomes excessive) at a time of climbing over a bump with either one (only one wheel) of the left and right front wheels, the regenerative torque of the first motor generator 11 is increased (the direct torque is reduced), the output torque of the second motor generator 12 is reduced, and the engagement force of the LSD clutch 51a of the center differential unit 51 is increased (the LSD clutch 51a is engaged) (in other words, the torque transmitted to the rear wheel side is increased), so as to reduce the input torque of the front LSD 62. Therefore, even when a rough accelerator operation is performed at a time of climbing over the bump with either one (one wheel) of the left and right front wheels, it is possible to reduce (suppress an increase in) the input torque (LSD torque) of the front LSD 62. Then, the differential limitation by the front LSD 62 is suppressed (relaxed), the generation of the yaw moment of the vehicle is suppressed, and it is thereby possible to maintain the straight traveling stability.

Further, according to the present embodiment, when the operation amount of the accelerator exceeds a predetermined value at a time of climbing over a bump with either one (only one wheel) of the left and right rear wheels, the regenerative torque of the first motor generator 11 is increased (the direct torque is reduced), the output torque of the second motor generator 12 is reduced, and the engagement force of the LSD clutch 51a of the center differential unit 51 is reduced (the LSD clutch 51a is disengaged) (that is, the torque transmitted to the rear wheel side is reduced), so as to reduce the input torque of the rear LSD 52. Therefore, even when a rough accelerator operation is performed at a time of climbing over the bump with either one (one wheel) of the left and right rear wheels, it is possible to reduce (suppress an increase in) the input torque (LSD torque) of the rear LSD 52. Then, the differential limitation by the rear LSD 52 is suppressed (relaxed), the generation of the yaw moment of the vehicle is suppressed, and it is thereby possible to maintain the straight traveling stability. As a result, according to the present embodiment, even when a rough accelerator operation is performed at a time of climbing over the bump (hump) with either one (only one wheel) of the left and right rear wheels, it is possible to suppress deterioration of the straight traveling stability at the time of climbing over the bump.

Further, according to the present embodiment, when the operation amount of the accelerator exceeds a predetermined value (becomes excessive) at a time of climbing over a bump with both the left and right front wheels (both wheels), the regenerative torque of the first motor generator 11 is increased (direct torque is reduced), the output torque of the second motor generator 12 is reduced, and the engagement force of the LSD clutch 51a of the center differential unit 51 is reduced (the LSD clutch 51a is disengaged) (that is, the differential limitation of the front and rear wheels is loosened), so as to reduce the input torque of the front LSD 62. Similarly, when the operation amount of the accelerator exceeds a predetermined value at a time of climbing over a bump with both the left and right rear wheels (both wheels), the regenerative torque of the first motor generator 11 is increased (direct torque is reduced), the output torque of the second motor generator 12 is reduced, and the engagement force of the LSD clutch 51a of the center differential unit 51 is reduced (the LSD clutch 51a is disengaged), so as to reduce the input torque of the rear LSD 52. Therefore, even when a rough accelerator operation is performed at a time of climbing over the bump with both the left and right wheels, it is possible to reduce (suppress an increase in) the input torque (LSD torque) of the front LSD 62 and the rear LSD 52. Further, the differential limitation by the front LSD 62 and the rear LSD 52 is suppressed (relaxed), the generation of the yaw moment of the vehicle is suppressed, and it is thereby possible to maintain straight traveling stability. As a result, even when a rough accelerator operation is performed at a time of climbing over the bump (hump) with both the left and right wheels, it is possible to suppress deterioration of straight traveling stability at the time of climbing over the bump.

Although an embodiment of the present invention has been described above, the present invention is not limited to the above embodiment, and various modifications can be made. For example, in the above-described embodiment, a case where the present invention is applied to a series-parallel hybrid vehicle (HEV) has been described as an example. The present invention, however, can also be applied to a hybrid vehicle of a different type (for example, a parallel hybrid vehicle or the like) or a plug-in hybrid vehicle (PHEV) that can be charged from the outside. In the above embodiment, two electric motors (the first motor generator 11 and the second motor generator 12) are provided. However, the number of electric motors is not limited to two (two motors) and may be one (one motor) or three (three motors) or more.

The above-described configuration of the driving force transmission system (for example, arrangement of gears, shafts, and the like) is an example and is not limited to the above-described embodiment. Further, although an electromagnetic clutch is used as the LSD clutch 51a in the above embodiment, a hydraulic clutch may be used.

Further, the system configuration of the controllers of the HEV-CU 80, the ECU 81, and the like, the function assignment of each controller, and the like are not limited to the above-described embodiment. In the above-described embodiment, the HEV-CU 80, the ECU 81, the VDCU 85, and the driving support device 86 are communicably coupled to each other via the CAN 100. However, the configuration of the system is not limited to such a form and can be optionally changed in consideration of, for example, functional requirements, costs, and the like.

In the above-described embodiment, the stereo camera 86a is used to detect an external environment (bump or the like). However, for example, a millimeter wave radar, a laser radar, an ultrasonic sensor, or the like may be used instead of the stereo camera. Alternatively, a plurality of different sensors may be used in combination.

In the above embodiment, to climb over a bump, the regenerative torque of the first motor generator 11 is increased (the direct torque is reduced), and the output torque of the second motor generator is reduced. However, the output torque of the engine 10 may be reduced by, for example, controlling the throttle valve in the closing direction, in addition to or instead of controlling driving of these motor generators.

According to the hybrid all-wheel-drive vehicle according to the present invention, in a case where the operation amount of the accelerator exceeds the predetermined value at the time of climbing over the bump, the driving of the motor generator and the engagement force of the center limited slip differential mechanism are controlled so as to reduce the input torque of the front limited slip differential and/or the rear limited slip differential in accordance with the wheel (s) being on the bump. Therefore, even when a rough accelerator operation is performed at the time of climbing over the bump, for example, the input torque (LSD torque) of the limited slip differential (the front limited slip differential and/or the rear limited slip differential) coupled to the wheel that is on the bump can be reduced (suppressed from increasing). As a result, the differential limitation by the limited slip differential (the front limited slip differential and/or the rear limited slip differential) coupled to the wheel (s) being on the bump is suppressed (relaxed), and generation of a yaw moment of the vehicle is suppressed. Consequently, the straight traveling stability can be maintained.

Advantageous Effects of Invention

According to the present invention, in a vehicle control device for a hybrid all-wheel-drive vehicle (AWD HEV vehicle) equipped with a torque-sensitive limited slip differential (LSD), even when a rough accelerator operation is performed at a time of climbing over a bump (hump), it is possible to suppress deterioration of straight traveling stability at the time of climbing-over.

REFERENCE SIGNS LIST 1 hybrid all-wheel-drive vehicle (AWD HEV)
10 engine
10A crankshaft
11 first motor generator
12 second motor generator
20 flywheel damper
30 power split mechanism
40 drive reduction gear mechanism
41 motor reduction gear
43 drive reduction gear
50 propeller shaft
51 center differential unit
51A LSD clutch
52 rear LSD (limited slip differential)
60 front drive shaft
62 front LSD (limited slip differential)
80 HEV-CU
81 ECU
82 PCU
85 VDCU
86 driving support device
91 accelerator pedal sensor
92 throttle opening-degree sensor
93 G sensor (acceleration sensor)
94 wheel speed sensor
95 rotation speed sensor
97, 98 resolver
100 CAN

The invention claimed is:

1. A hybrid all-wheel-drive vehicle comprising:
an engine;
a motor generator that is coupled such that torque can be transmitted between the motor generator and a crankshaft of the engine;
a front limited slip differential that is between the engine and the motor generator and left and right front wheels, the front limited slip differential being a torque-sensitive type differential configured to limit a differential between the left and right front wheels in accordance with an input torque;
a center differential unit that is between the left and right front wheels and left and right rear wheels, the center differential unit comprising a center limited slip differential mechanism and being configured to limit a differential of the left and right front wheels and the left and right rear wheels in accordance with an engagement force of the center limited slip differential mechanism, the center differential unit being configured to distribute an input torque to a front wheel side and a rear wheel side;
a rear limited slip differential that is between the center differential unit and the left and right rear wheels, the rear limited slip differential being a torque-sensitive type differential configured to limit a differential between the left and right rear wheels in accordance with an input torque;

an accelerator-operation detection unit configured to detect an operation state of an accelerator;

a bump detection unit configured to detect a bump on a road surface in front of the vehicle; and a control unit configured to control driving of the engine, driving of the motor generator, and the engagement force of the center limited slip differential mechanism, wherein the control unit is configured to, in a case where an operation amount of the accelerator exceeds a predetermined value at a time of climbing over the bump detected by the bump detection unit, control the driving of the motor generator and the engagement force of the center limited slip differential mechanism so as to reduce (1) an input torque of the front limited slip differential, (2) an input torque of the rear limited slip differential, or (3) both the input torque of the front limited slip differential and the input torque of the rear limited slip differential, in accordance with one or more wheels being on the bump.

2. The hybrid all-wheel-drive vehicle according to claim 1, wherein the control unit is configured to, in a case where the operation amount of the accelerator exceeds the predetermined value at the time of climbing over the bump with either one of the left and right rear wheels, control the driving of the motor generator and reduce the engagement force of the center limited slip differential mechanism so as to reduce the input torque of the rear limited slip differential.

3. The hybrid all-wheel-drive vehicle according to claim 1, wherein the control unit is configured to, in a case where the operation amount of the accelerator exceeds the predetermined value at the time of climbing over the bump with both the left and right front wheels, control the driving of the motor generator and reduce the engagement force of the center limited slip differential mechanism so as to reduce the input torque of the front limited slip differential.

4. The hybrid all-wheel-drive vehicle according to claim 1, wherein the control unit is configured to, in a case where the operation amount of the accelerator exceeds the predetermined value at the time of climbing over the bump with both the left and right rear wheels, control the driving of the motor generator and reduce the engagement force of the center limited slip differential mechanism so as to reduce the input torque of the rear limited slip differential.

5. The hybrid all-wheel-drive vehicle according to claim 1, wherein the motor generator includes a first motor generator that is coupled to the crankshaft of the engine via a power split mechanism such that torque can be transmitted between the first motor generator and the crankshaft, and a second motor generator that is coupled to an output shaft of the power split mechanism such that torque can be transmitted between the second motor generator and the output shaft.

6. The hybrid all-wheel-drive vehicle according to claim 1, wherein the control unit is configured to predict, based on a distance to the bump having detected and a speed of the vehicle, a timing of climbing over the bump, and determine, based on a wheel speed of each of four wheels, whether each wheel is on the bump.

7. The hybrid all-wheel-drive vehicle according to claim 1, wherein the control unit is configured to predict, based on a shape and a size of the bump having detected and an arrangement of the bump on a road, whether the bump is to be climbed over with one wheel or both wheels and identify wheel(s) being on the bump based on a wheel speed of each of four wheels.

8. The hybrid all-wheel-drive vehicle according to claim 1, wherein the control unit is configured to control, at the time of climbing over the bump detected by the bump detection unit, the driving of the motor generator in consideration of a shape, a size, and a height of the bump having detected.

9. The hybrid all-wheel-drive vehicle according to claim 1, wherein the control unit is configured to, after the left and right front wheels and the left and right rear wheels finish climbing over the bump, control the driving of the engine and the driving of the motor generator in accordance with the operation amount of the accelerator and control the engagement force of the center limited slip differential mechanism in accordance with an operational state of the vehicle.

10. The hybrid all-wheel-drive vehicle according to claim 1, wherein the control unit is configured to, in a case where the operation amount of the accelerator exceeds the predetermined value at the time of climbing over the bump with either one of the left and right front wheels, control the driving of the motor generator and increase the engagement force of the center limited slip differential mechanism so as to reduce the input torque of the front limited slip differential.

11. The hybrid all-wheel-drive vehicle according to claim 10, wherein the control unit is configured to, in a case where the operation amount of the accelerator exceeds the predetermined value at the time of climbing over the bump with either one of the left and right rear wheels, control the driving of the motor generator and reduce the engagement force of the center limited slip differential mechanism so as to reduce the input torque of the rear limited slip differential.

12. The hybrid all-wheel-drive vehicle according to claim 10, wherein the control unit is configured to, in a case where the operation amount of the accelerator exceeds the predetermined value at the time of climbing over the bump with both the left and right front wheels, control the driving of the motor generator and reduce the engagement force of the center limited slip differential mechanism so as to reduce the input torque of the front limited slip differential.

13. The hybrid all-wheel-drive vehicle according to claim 10, wherein the control unit is configured to, in a case where the operation amount of the accelerator exceeds the predetermined value at the time of climbing over the bump with both the left and right rear wheels, control the driving of the motor generator and reduce the engagement force of the center limited slip differential mechanism so as to reduce the input torque of the rear limited slip differential.

14. The hybrid all-wheel-drive vehicle according to claim 10, wherein the motor generator includes a first motor generator that is coupled to the crankshaft of the engine via a power split mechanism such that torque can be transmitted between the first motor generator and the crankshaft, and a second motor generator that is coupled to an output shaft of the power split mechanism such that torque can be transmitted between the second motor generator and the output shaft.

15. The hybrid all-wheel-drive vehicle according to claim 10, wherein the control unit is configured to predict, based on a distance to the bump having detected and a speed of the vehicle, a timing of climbing over the bump, and determine, based on a wheel speed of each of four wheels, whether each wheel is on the bump.

16. The hybrid all-wheel-drive vehicle according to claim 10, wherein the control unit is configured to predict, based on a shape and a size of the bump having detected and an arrangement of the bump on a road, whether the bump is to be climbed over with one wheel or both wheels and identify wheel(s) being on the bump based on a wheel speed of each of four wheels.

17. The hybrid all-wheel-drive vehicle according to claim 10, wherein the control unit is configured to control, at the time of climbing over the bump detected by the bump detection unit, the driving of the motor generator in consideration of a shape, a size, and a height of the bump having detected.

18. The hybrid all-wheel-drive vehicle according to claim 10, wherein the control unit is configured to, after the left and right front wheels and the left and right rear wheels finish climbing over the bump, control the driving of the engine and the driving of the motor generator in accordance with the operation amount of the accelerator and control the engagement force of the center limited slip differential mechanism in accordance with an operational state of the vehicle.

19. A hybrid all-wheel-drive vehicle comprising:
  an engine;
  a motor generator that is coupled such that torque can be transmitted between the motor generator and a crankshaft of the engine;
  a front limited slip differential that is between the engine and the motor generator and left and right front wheels, the front limited slip differential being a torque-sensitive type differential configured to limit a differential between the left and right front wheels in accordance with an input torque;
  a center differential unit that is between the left and right front wheels and left and right rear wheels, the center differential unit comprising a center limited slip differential mechanism and being configured to limit a differential of the left and right front wheels and the left and right rear wheels in accordance with an engagement force of the center limited slip differential mechanism, the center differential unit being configured to distribute an input torque to a front wheel side and a rear wheel side;
  a rear limited slip differential that is between the center differential unit and the left and right rear wheels, the rear limited slip differential being a torque-sensitive type differential configured to limit a differential between the left and right rear wheels in accordance with an input torque;
  a sensor configured to detect an operation state of an accelerator;
  first circuitry configured to detect a bump on a road surface in front of the vehicle; and
  second circuitry configured to control driving of the engine, driving of the motor generator, and the engagement force of the center limited slip differential mechanism,
  wherein the second circuitry is configured to, in a case where an operation amount of the accelerator exceeds a predetermined value at a time of climbing over the bump detected by the first circuitry, control the driving of the motor generator and the engagement force of the center limited slip differential mechanism so as to reduce (1) an input torque of the front limited slip differential, (2) an input torque of the rear limited slip differential, or (3) both the input torque of the front limited slip differential and the input torque of the rear limited slip differential, in accordance with one or more wheels being on the bump.

* * * * *